United States Patent Office 3,418,763
Patented Dec. 31, 1968

3,418,763
METHOD FOR MAINTAINING OF CENTERING
HOLES IN CENTERLESS INFEED GRINDING
John Eric V. Söderquist, Halmstad, Sweden, assignor to
Aktiebolaget Malcus Holmquist, Halmstad, Sweden, a
corporation of Sweden
Filed Nov. 15, 1965, Ser. No. 507,888
Claims priority, application Sweden, Nov. 27, 1964,
14,380/64
2 Claims. (Cl. 51—281)

ABSTRACT OF THE DISCLOSURE

A system for maintaining the concentricity of preexisting centering holes in a workpiece which is to be externally, centerless, infeed ground, includes a governing wheel and a grinding wheel having respective, parallel longitudinal axes of rotation and means to provide relative mutual movement of said axes, and a pair of spindles mounted in a mutual, stationary axis of rotation for relative mutual movement along said axes, said stationary axis being disposed between and parallel to said wheel axes. The spindles support respective grinding rods which are initially inserted into the preexisting centering holes of the workpiece. Subsequently the wheel axes are moved towards each other to cause the grinding wheel to grind the exterior surface of the workpiece, and the grinding rods to grind the interior surface of the respective centering holes.

Circular grinding in a centerless grinder is considerably faster and consequently cheaper than in a grinding machine with stationary centres. There are however, specially in the automobile industry, several details that cannot be ground centerless since centering holes are necessary for grinding in another manufacture step and such holes would lose the centering in a centerless grinding. That concerns crankshafts, camshafts, shafts in gearboxes etc. where centering holes are necessary for grinding of e.g. flanks of teeth and splines.

The object of the present invention is to make centerless grinding possible also of such details and has for that purpose got the characteristics stated in the claims.

Figure 1:
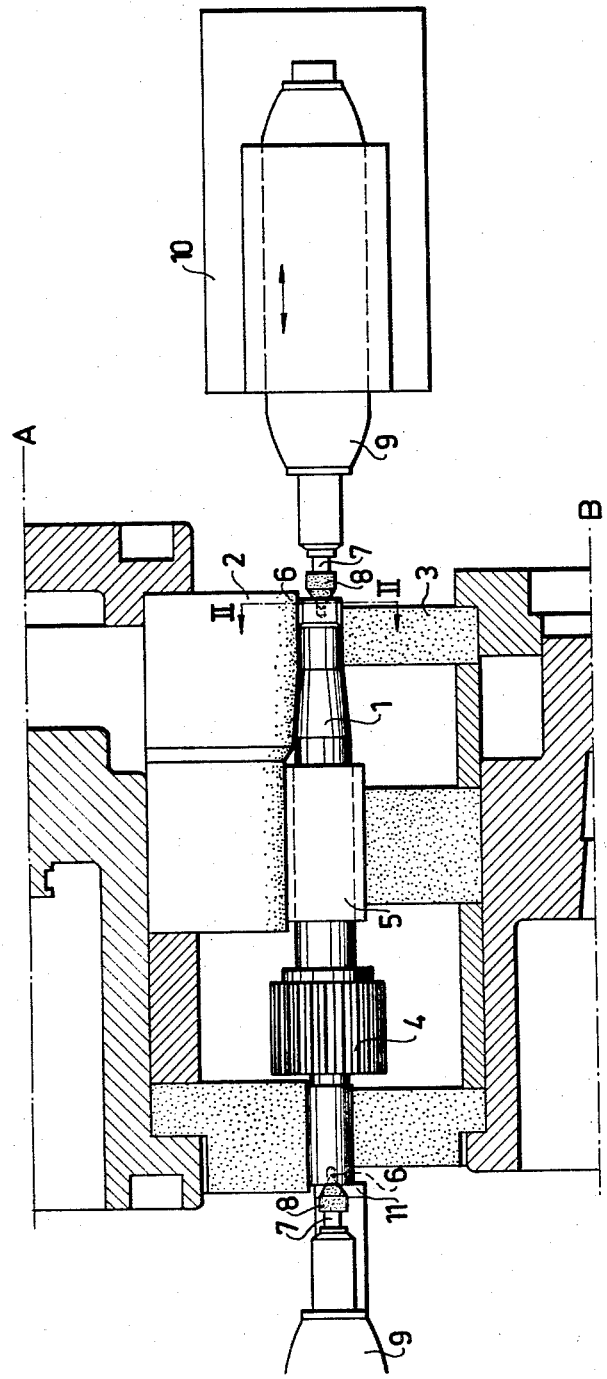
Figure 2:
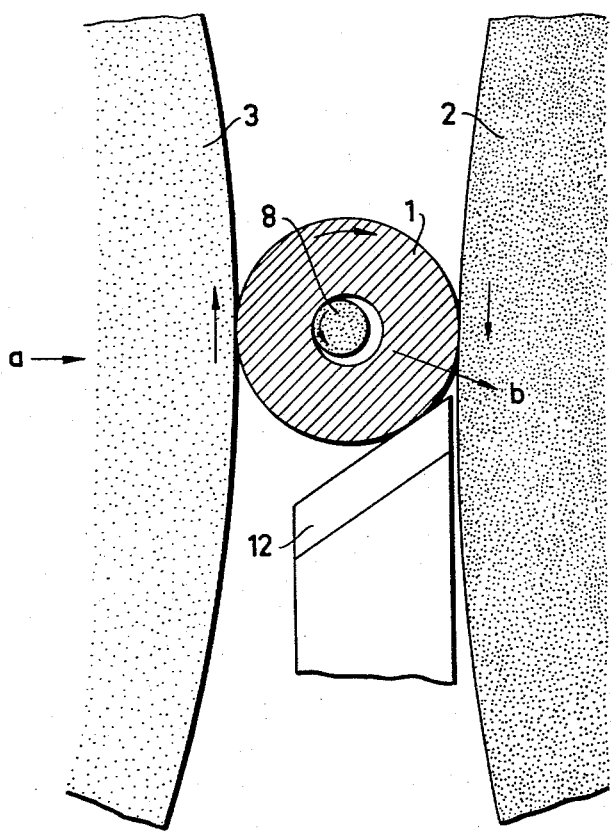

The invention will be described in connection with the enclosed drawings where:

FIG. 1 in a horizontal view shows a shaft which is being grinded in method the according to the invention, and FIG. 2 is a section in an enlarged scale on the line II—II in FIG. 1.

A workpiece 1 is fitted up for infeed grinding in a centerless grinder with a grinding wheel 2 with axis of rotation A and a governing wheel 3 with axis of rotation B bearing against the different daimeters of the workpiece. The workpiece is provided with teeth 4 and splines 5 whose flanks require centering holes for their grinding.

In order not to lose the centering of these holes in the centerless grinding one grinds the centering holes as well in the same grinding. This is performed by means of a grinding spindle 7 for each centering hole. This grinding spindle which in this case rotates in the opposite direction to the workpiece carries a grinding rod 8 (for unhardened material a hard metal cutter can also be used). Each grinding spindle is carried in a rest 9 which is mounted on a slide 10 axially movable for adjusting of the grinding rod against the workpiece. The slides may also if necessary be provided with a feeding movement. Under one of the grinding spindles an end support 11 for the workpiece is seen.

The grinding is accomplished by the movement of the governing wheel 3 towards the grinding wheel (see the arrow *a* in FIG. 2). The workpiece is pressed against the grinding wheel 2 and the supporting rail 12 and the centering hole 6 moves during the grinding in the direction of the arrow *b* a distance about half the grinding allowance of the outer diameter, which is enough for the grinding allowance of the centering holes. For that reason any special feeding movement of the slide 10 is not normally required. The conditions are similar if the grinding is accomplished by the movement of the grinding wheel towards the governing wheel. Just the direction of the movement of the centering holes will then be different.

In order to obtain a better grinding of the 30° inclined side surfaces of the centering holes one can provide the grinding spindle with an oscillating movement along this surface to the left in FIG. 2 (downwards in FIG. 1).

I claim:
1. A method of centerless infeed grinding of a workpiece for maintaining the concentricity of preexisting centering holes in the workpiece comprising:
   initially inserting a grinding rod along a stationary longitudinal axis thereof into the preexisting centering holes in the workpiece respectively; and
   subsequently externally infeed grinding the workpiece between a governing wheel and a grinding wheel, thereby concurrently shifting the longitudinal axis of the workpiece laterally (1) towards the longitudinal axis of the grinding wheel and (2) away from said longitudinal axis of said grinding rods, so that concurrently (1) the external surface of the workpiece is ground by the grinding wheel and (2) the internal surface of each centering hole is ground by the respective grinding rod.

2. A method according to claim 1 wherein:
   the grinding rods are fed axially along their stationary longitudinal axis during the grinding step.

References Cited

UNITED STATES PATENTS

| 1,842,375 | 1/1932 | Einstein | 51—103 X |
| 2,412,048 | 12/1946 | Kaplan | 51—103 |
| 2,952,101 | 9/1960 | Carlson | 51—281 X |

LESTER M. SWINGLE, *Primary Examiner.*

U.S. Cl. X.R.
51—103